E. F. HALLIWELL.
SHAFT BEARING.
APPLICATION FILED JUNE 22, 1907.
927,791.
Patented July 13, 1909.
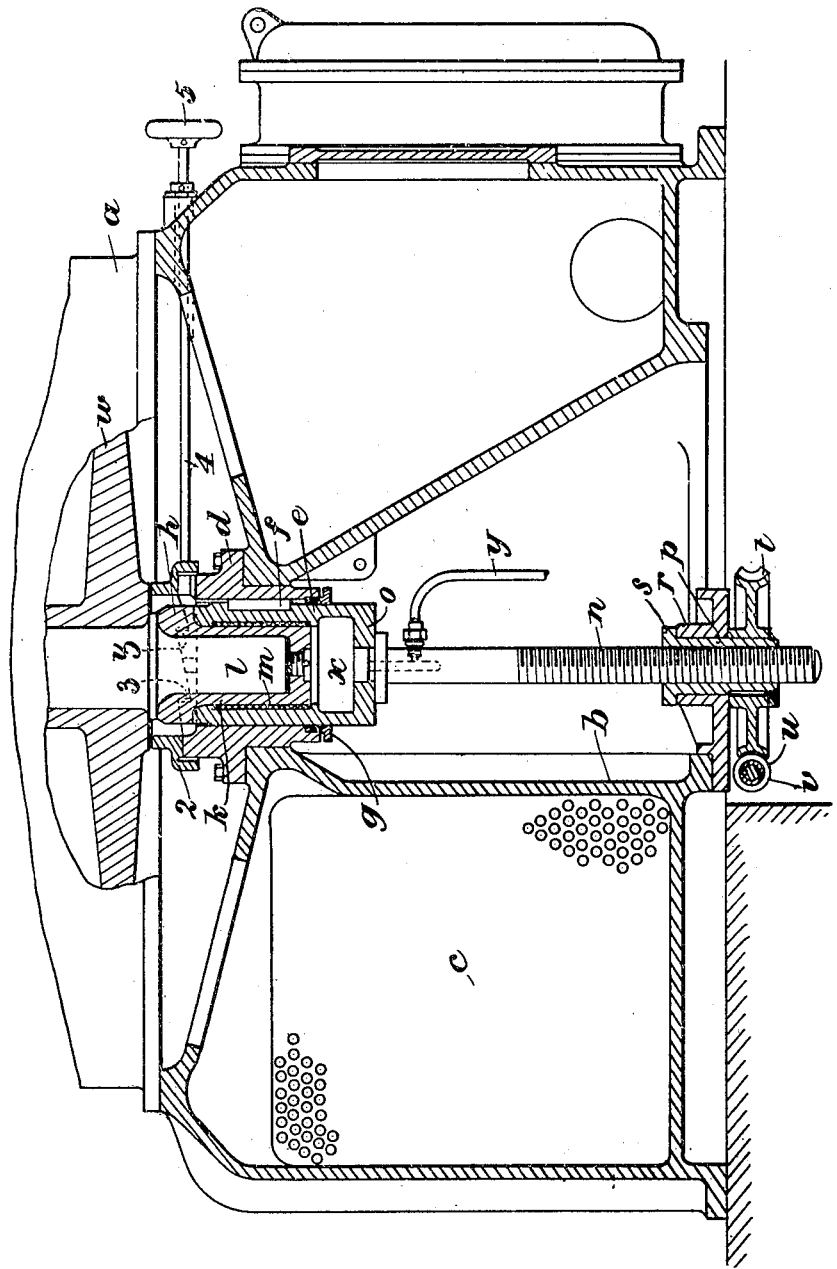
WITNESSES:
K. Ahlquist
C. G. Seeley
INVENTOR
R. F. Halliwell

UNITED STATES PATENT OFFICE.

REGINALD FRANCIS HALLIWELL, OF RUGBY, ENGLAND, ASSIGNOR TO GENERAL ELECTRIC COMPANY, A CORPORATION OF NEW YORK.

SHAFT-BEARING.

No. 927,791.  Specification of Letters Patent.  Patented July 13, 1909.

Application filed June 22, 1907. Serial No. 380,301.

*To all whom it may concern:*

Be it known that I, REGINALD FRANCIS HALLIWELL, a subject of the King of Great Britain, residing at 36 Newbold road, Rugby, in the county of Warwick, England, engineer, have invented certain new and useful Improvements in and Relating to Shaft-Bearings, of which the following is a specification.

This invention relates to improvements in shaft bearings such as are used in elastic fluid turbines, and more particularly applicable to the type of turbine having a vertical shaft mounted on a base in which a condenser is situated. Hitherto with this type of turbine it has been usual to arrange the step bearing for the turbine shaft in an opening formed in the under side of the condenser. This necessitates the use of an additional or guide bearing for the shaft at the upper side of the condenser where the shaft passes into the wheel casing.

With the above arrangement there is great difficulty in securing accurate alinement and, with machines running at the high speeds at which elastic fluid turbines usually run, the extra length of shaft required to pass through the condenser increases the tendency of the shaft to whip or bend thereby causing it to bind in the intermediate or guide bearing.

The object of the present invention is to overcome the difficulty of accurate alinement and to provide a combined step and guide bearing situated at or near the upper side of the condenser, which is easy of access for adjustment or repairs, and reduces the total length of the turbine shaft required thereby decreasing the tendency of the shaft to whip or bend when running at high speeds.

The accompanying drawing illustrates my invention.

In the drawing I have shown a vertical turbine *a* of the well-known Curtis type mounted upon a base *b* containing a condenser *c*. In the upper side of the base I provide a central aperture in which is fitted a fixed cylindrical bush or liner *d* inside which is slidingly fitted a journal or step bearing *e* so secured as to be capable of longitudinal movement in the bush *d* but prevented from rotation therein by means of a key or feather *f*. The lower end of the fixed bush is provided with a gland *g* and packing so as to prevent leakage between the bush and the journal without interfering with the relative movement between the two. The upper end of the journal *e* forms a bearing for a flange or collar *h* which may be either formed integral with the shaft itself at a short distance from its lower end or as illustrated it may form part of a liner *k* secured to and surrounding the lower end of the shaft *l*. The lower end of this liner *k* with the inclosed portion of the shaft is adapted to project into the bearing. The surface of the journal or bearing *e* with which the shaft or liner engages is preferably lined with anti-friction metal *m* provided with suitable grooves to conduct lubricant to the bearing surfaces. It will be seen from the above that the weight of the moving element of the turbine is carried by flange *h* at the upper end of the bearing *e*, the length of the bearing being slightly longer than the portion of the shaft or the liner *k* surrounding the shaft which projects into it.

In order to adjust the movable element of the turbine I secure a screw rod *n* in axial alinement with the journal bearing. This rod is rigidly secured at its upper end to the lower end of the sliding bearing *e* which is closed with a blind flange or plate *o* cast integral with the sides of the bearing. The lower end of the rod has a screw-thread formed on it which passes through an internally screwed bush *p* fitting into a crosshead *r* rigidly secured by means of a key to the base *b* of the condenser. The bush is capable of rotating in the cross-head but is held against longitudinal movement therein by a flange *s* bearing on one side of the crosshead and a worm wheel *t* secured to the bush and bearing against the other side of the cross-head *r*. Additional means for preventing longitudinal movement of the bush may be provided if desired. The worm wheel *t* secured to the bush engages with a worm *u* carried by a shaft *v* which may pass through the base at any suitable point and may be provided with a hand-wheel or other suitable means for turning it. When it is desired to raise or lower the rotating element of the turbine this hand wheel is turned in the desired direction thus causing the worm to rotate the worm wheel $t$ and bush $p$ to which it is secured. As the bush is prevented from moving longitudinally through the cross-head the screwed rod $n$ passing through the bush is raised or lowered, carrying with it the journal bearing and the rotating element $w$ of the turbine. Lubricant under pressure is supplied to the bearing from any suitable source and may be led directly into the inclosed space $x$ in the lower end of the bearing below the end of the shaft, or in the screwed rod supporting the bearing may be made hollow for a portion of the length as illustrated and the lubricant admitted to this portion which is in direct communication with the space $x$ above referred to through a pipe $y$.

In order that the weight of the rotating element may be taken off the journal bearing so that the bearing may be taken out for inspection or repair, the upper flange of the bush fixed in the upper side of the base of the machine is formed with one or more inclined surfaces similar to those of an ordinary overrunning claw clutch. Directly above this bush is a loose annular ring provided with complementary angular surfaces or claws adapted to engage with those on the bush. Normally when the claws are in full engagement the upper side of the annular ring is clear but when the ring is rotated and the surfaces on it slide up those on the bush the upper surface comes into contact with a collar on the shaft or with the boss of the lowermost wheel of the rotating element. Further rotation of this ring raises the shaft thereby taking the weight of the rotating element off the upper surface of the bearing and bringing it on to the fixed bush $d$. Any convenient method of rotating the ring may be employed, for example it may have a worm wheel formed on its outer surface engaging with a worm carried by a shaft 4 projecting through to the outside of the casing and provided with a hand wheel 5 or other means for rotating it. When the weight is taken off the bearing by the ring the bearing may be lowered and entirely withdrawn from the bush and inspected or repaired or a new bearing inserted.

A bearing constructed as above described is simple in construction and not liable to get out of order and is easily accessible when it is desired to inspect or repair it. The lubricant being supplied from the lower end and passing upward carries any particle of metal worn off at the thrust bearing portion, away from the bearing instead of carrying them into the guiding portion as is usually the case.

It will be obvious that alterations in the construction and arrangement of the various parts of the modifications of my invention described above may be made without departing from the spirit and scope of the invention.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States is:

1. A combined step and guide bearing comprising a fixed bushing, a bearing adapted to slide longitudinally in said bushing, a shaft adapted to rotate in said bearing, a collar formed on the shaft and a flange formed on the upper end of the bearing on which said collar is adapted to engage.

2. A combined step and guide bearing comprising a fixed bushing, a bearing adapted to slide longitudinally in said bushing, means for preventing rotation of said bearing, a shaft rotatably mounted in said bearing, and means for adjusting the bearing in said bushing.

3. A combined step and guide bearing comprising a fixed bushing, a bearing within said bushing having guiding and bearing surfaces, said bearing being closed at its lower end, a rotatable shaft in said bearing, a flange formed on the upper end of the bearing, a coöperating projection formed on the shaft, and means for forcing lubricant from the lower end of the bearing first between the guiding surfaces and then between the bearing surfaces.

4. An elastic fluid turbine comprising stationary and rotating elements, a combined step and guide bearing for said rotating element, and mechanical means for relieving the bearing of the weight of the rotating elements comprising a member that surrounds the shaft, and means for simultaneously imparting angular and axial movements to said member 5. An elastic fluid turbine comprising stationary and rotating elements, a combined step and guide bearing for said rotating element, and means for mechanically relieving the weight of said rotating element consisting of relatively movable members having inclined bearing surfaces.

6. An elastic fluid turbine comprising stationary and rotating elements, a vertical shaft for said rotating element, and means for raising said shaft consisting of an axially fixed ring having inclined teeth formed on its upper surface, a ring adapted to cause axial movement of the shaft, said ring having complementary teeth engaging the teeth on the first mentioned ring and means for producing relative rotation of the rings.

7. In combination with an elastic fluid turbine having stationary and rotating elements, a vertical shaft for said rotating element, a combined step and guide bearing for said shaft, a fixed bushing for said bearing, inclined teeth formed on the upper side of said bushing, an annular ring rotatably mounted above said bushing and having complementary teeth engaging the teeth on the bushing, a projection on the shaft engaging said ring, and means for rotating said ring.

In witness whereof I have hereunto set my hand in presence of two witnesses.

REGINALD FRANCIS HALLIWELL.

Witnesses:
CHARLES H. FULLER,
J. A. FOSTER.